July 5, 1949.   F. H. SLAYMAKER ET AL   2,474,918
RANGING SYSTEM

Filed July 30, 1945   2 Sheets-Sheet 1

INVENTOR.
FRANK H. SLAYMAKER
WILLARD F. MEEKER
BY
D. Clyde Jones
ATTORNEY

July 5, 1949.  F. H. SLAYMAKER ET AL  2,474,918
RANGING SYSTEM

Filed July 30, 1945  2 Sheets-Sheet 2

INVENTOR.
FRANK H. SLAYMAKER
WILLARD F. MEEKER
BY
D. Clyde Jones
ATTORNEY

Patented July 5, 1949

2,474,918

UNITED STATES PATENT OFFICE 2,474,918

RANGING SYSTEM

Frank H. Slaymaker and Willard F. Meeker, Rochester, N. Y., assignors to Stromberg-Carlson Company, Rochester, N. Y., a corporation of New York Application July 30, 1945, Serial No. 607,840

2 Claims. (Cl. 177—352)

This invention relates to a method of and to apparatus for ranging and more particularly to the location of unseen objects.

In many situations where it is not possible to determine visually the location of objects, it is frequently desirable to provide warning signals, preferably audible, which vary in characteristics, such as pitch, when the observer approaches the objects or when the objects approach the observer, as the case may be. In achieving this result it has been proposed in the past to employ a frequency modulation ranging system wherein a transmitter continuously radiates signals varying in frequency such as according to a saw-tooth pattern and wherein a receiver continuously receives the reflected signals or echoes. However, it has been discovered that where continuous radiation and reception of this type are employed, anomalies can occur which make the distance indication uncertain if not entirely erroneous in certain instances.

In accordance with the main feature of the present invention, there is provided a method and apparatus whereby reliable frequency modulation ranging may be effected.

Other features of the invention will appear from the detailed description and claims when taken with the drawings in which:

Figure 1:
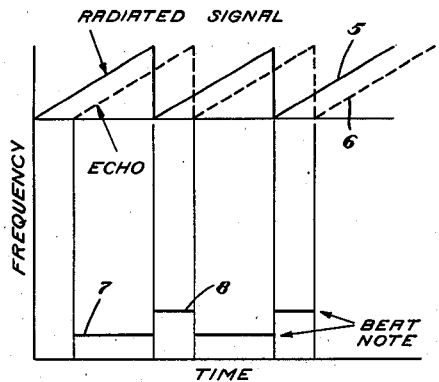
Fig. 1 is a chart useful in explaining the anomalies that can occur in conventional ranging systems.

In a frequency modulation ranging system where there is a continuous radiation of a signal such as is indicated by the heavy saw-tooth curve 5, the echo of such a signal as it is reflected from distant objects or obstacles will be of the same saw-tooth pattern as the radiated signal but will be delayed in time. This may be represented by the dotted line saw-tooth curve 6 of Fig. 1. The difference in frequency between the radiated signal 5 and the echo 6 of that signal can be used to give an indication of the distance from the radiator to the obstacle. This difference in frequency results in a beat note as indicated at 7 and 8 in Fig. 1. As the distance from the radiator to the obstacle increases a portion of the beat note designated 7 increases in frequency while the portion of the beat note, designated 8, decreases in frequency. The presence of two beat notes changing in opposite directions with changes in distance can cause confusion.

Figure 2:
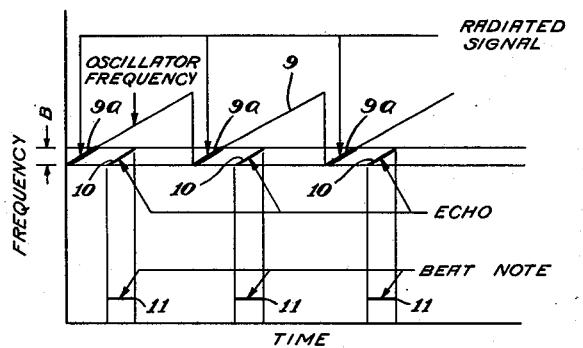
Fig. 2 is a chart useful in explaining the novel method of the present invention.

In accordance with the method of the present invention, it is proposed to eliminate one of the beat notes, such as 8. By way of example, it is proposed to generate a single set of oscillations and to radiate a varying frequency signal during the first part only of given periods. In effecting radiation, there is provided a local source of oscillations the frequency of which varies according to a saw-tooth pattern. The oscillator should continue to oscillate even during that portion of the period that the signal is not being radiated and the frequency should follow the original saw-tooth pattern. The method just referred to is indicated in the chart of Fig. 2 wherein the saw-tooth curve 9 represents the continuous oscillations the frequency of which varies periodically according to a given saw-tooth pattern. However, only that portion of frequencies 9 indicated by the heavy line 9a is radiated. The parts of the radiated signal which are reflected back as echoes, are indicated by the portions of the reflected saw-tooth curve indicated by the lines designated 10. The frequencies indicated by the lines 10 combine with the oscillator frequencies 9, to produce a beat note 11. From this chart it will be seen that the beat note between the echo and the oscillator frequencies becomes a series of short pulses, the frequency of each pulse being directly proportional to the distance from the radiator to the obstacle and back again to the point of reception.

Figure 3:
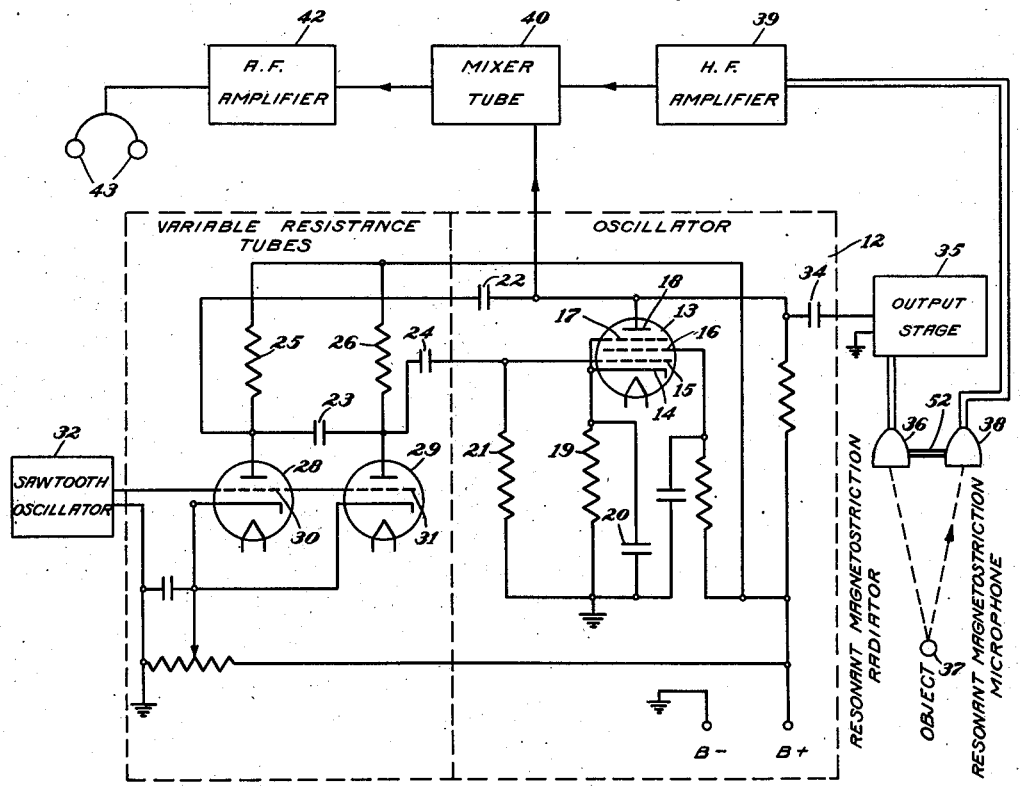
Fig. 3 is a diagrammatic showing of the circuits and apparatus used in practicing the method of the present invention.

While this method of ranging can be effected by various equipment, it is convenient to use the apparatus and circuits diagrammatically illustrated in Fig. 3. In this arrangement there is provided an oscillator 12 of the resistance-capacitance, phase-shift type. This oscillator, preferably, includes an electron discharge tube 13 of the pentode type comprising the cathode 14, control grid 15, screen grid 16, suppressor grid 17 and anode 18. The input circuit of the oscillator includes the cathode 14, in series with the biasing resistor 19 (which is by-passed by condenser 20), resistor 21 and control grid 15. The output of the oscillator tube including anode 18, is connected through a phase shift network to the control grid 15, in the well-known manner. This phase shift network comprises the condensers 22, 23 and 24 connected in series and the resistors 21, 25 and 26 connected in multiple therewith. It will be understood that the oscillator frequency is determined in part by the values of the mentioned resistors and condensers. In the present arrangement, the plate resistances of vacuum tubes 28 and 29 designated "Variable resistance tubes," in Fig. 3, are respectively connected in multiple with the resistors 25 and 26 and function as the adjustable part of the phase shift network by which the oscillator frequency is controlled. The plate resistances of the control tubes 28 and 29 is a function of the potential on the grids 30 and 31 of these tubes. The potential on these grids in turn, follows the voltage output of the saw-tooth oscillator 32. The frequency of the oscillator 12, therefore, varies in a saw-tooth manner. The output of the oscillator 12 is coupled through the condenser 34, with an output amplifier stage 35. As previously mentioned, a portion only of the generated frequencies, namely band B (Fig. 2) is radiated. In order to limit the radiated frequencies to the band B, a suitable band pass filter device may be coupled to the output circuit of the output amplifier stage 35. In the present arrangement it is preferred that the band pass filter take the form of a resonant magnetostriction radiator 36 which will be described. The band of frequencies 9a (Fig. 2) will be radiated by radiator 36 and upon encountering the object 37 will be reflected and picked up by the resonant magnetostriction microphone 38. These reflected frequencies will be amplified in the high frequency amplifier 39 and in the mixer tube 40 will be combined with oscillations from the oscillator 12 to develop a beat note, such as 11 (Fig. 2). This beat note will be amplified in the audio amplifier 42 and can be heard in the head phones 43. As the distance between the object 37 and microphone 38 changes, the pitch of the beat note will change in a distinctive manner.

Figure 5:
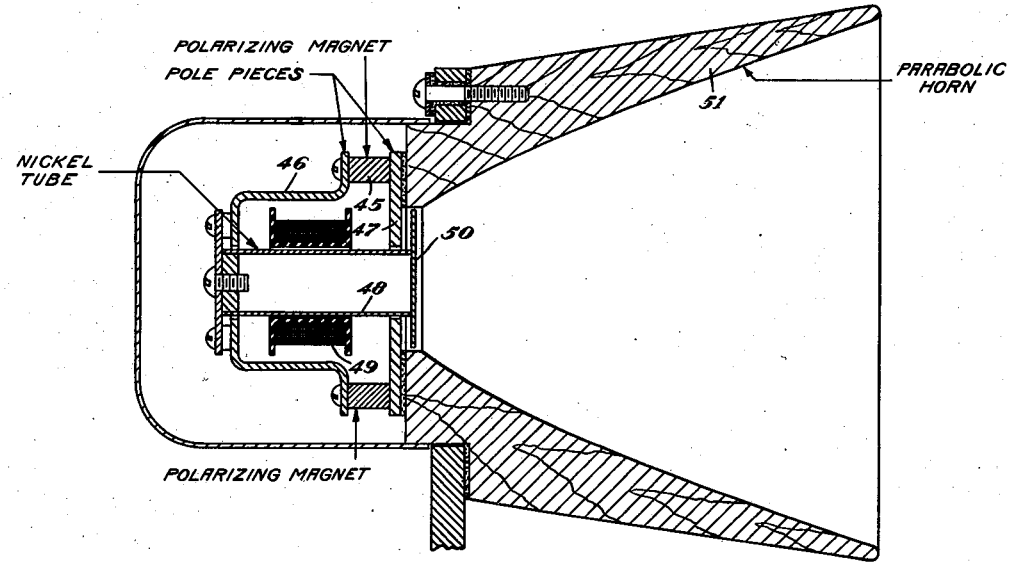
Fig. 5 is a sectional view illustrating the construction of the magnetostriction device which can be used as a radiator or as a microphone.

The resonant magnetostriction radiator unit 36 and the resonant magnetostriction microphone unit 38, may be of the construction more fully disclosed in Fig. 5. This unit comprises a driver made up of the polarizing magnets 45 in the form of blocks mounted between the U-shape polepiece 46 and the apertured polepiece 47. A hollow nickel tube 48 is secured at one end of the polepiece 46 so that its other end extends axially through the opening in the polepiece 47. The free end of the nickel tube 48 has a diaphragm 50 secured thereto. A coil 49 encircles the tube 48. The unit also comprises a parabolic horn 51, of wood or like material, having an opening in its restricted end to receive the diaphragm 50. The driver unit and the horn are joined together with cushioning material therebetween tending to prevent mechanical coupling between the horn and the driver. The polarizing magnets 45 maintain a magnetic field through the nickel tube 48. When a varying current flows through the coil 49, the field varies and because of the magnetostrictive properties of nickel, the length of the nickel tube 48 changes also. Since the back end of the nickel tube is fixed, the front end is free to move and radiate sound. A suitable magnetostriction transducer is described and claimed in a co-pending application of Frank H. Slaymaker, Willard F. Meeker, and Lynn L. Merrill, Serial No. 676,425, filed June 13, 1946, and assigned to the same assignee as the present invention.

Since the present invention may have an important field of use in guiding the blind, the ranging system can be made portable and the two magnetostriction units are mounted side by side on a common handle 52 (Figs. 3 and 4) so that they can be aimed by the user.

Figure 4:
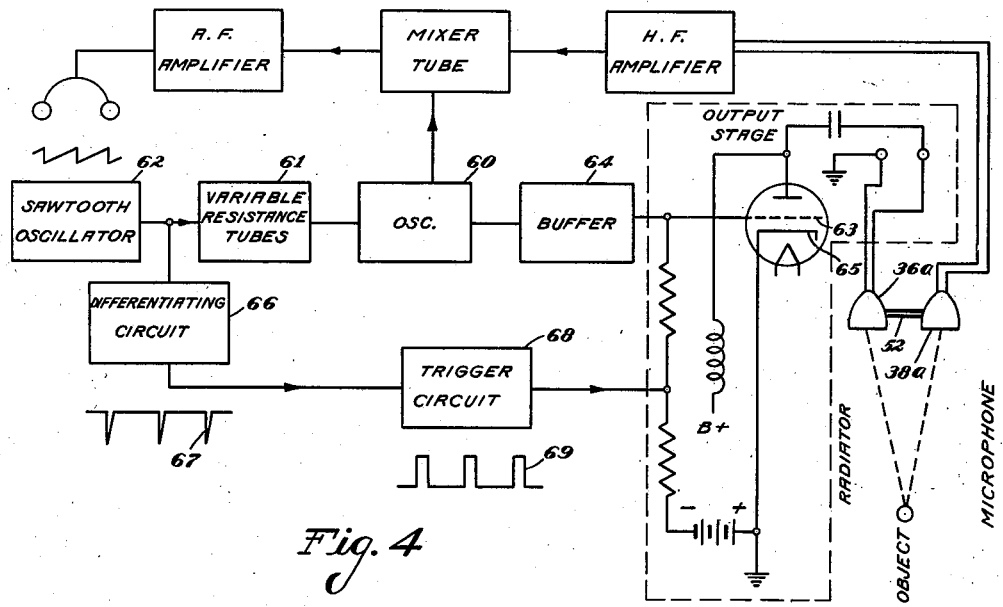
Fig. 4 is a diagrammatic showing of a modified ranging system.

In the foregoing arrangement, the equivalent of a band pass filter was utilized to limit the radiated frequencies to a band B (Fig. 2), but in the modified form of the invention illustrated in Fig. 4, the limitation of radiated frequencies to band B is effected by electronic switching means. As in the arrangement of Fig. 3, the oscillator 60 is of the resistance-capacitance, phase-shift type and the unit 61 including the variable resistance tubes (like those designated 28 and 29 of Fig. 3) controls the oscillator frequency. As before the saw-tooth oscillator 62 acting on the grids of the variable resistance tubes in unit 61, causes the frequency of the oscillator to vary in a saw-tooth manner. The output of the oscillator 60 is delivered through a buffer unit 64, to the output amplifier stage including the vacuum tube 65. The grid 63 of the tube 65 is normally biased to cut-off with the result that, while the oscillator 60 continues to oscillate, the tube 65 in its cut-off state will not deliver oscillations to the radiator 36a. When frequencies within the band B are to be radiated, during each period, the output stage including the amplifier tube 65 is rendered conducting so that the output stage acts in the manner of an electronic switch. This control of the output stage is effected by applying a positive pulse to control grid 63 which causes tube 65 to amplify. The positive pulse is derived by introducing a component of the saw-tooth oscillator into the differentiating circuit 66 to develop an output indicated by the curve 67 (Fig. 4). This output is applied to a well known trigger circuit 68 wherein positive pulses 69 are generated, for controlling the grid 63. The radiator 36a and the microphone 38a need not be highly resonant when used in this modification. In the arrangement of Fig. 4 the reception and translation of a reflected signal is effected in the same manner as in the arrangement of Fig. 3. Corresponding receiving elements in Fig. 4 are identified by the same reference characters as used in Fig. 3 except for the addition of the letter "a."

The operation of this modified arrangement will be obvious from the foregoing description.

While the principle of the invention has been specifically disclosed in connection with using supersonics in air, the invention is not so limited. For example, referring to Fig. 3, it is within the principles of our invention to employ a magnetostriction device of the resonant type only for the transmitter, the receiver having broader band pass characteristics, in which case a relatively narrow band of frequencies is radiated. Our invention also is applicable to underwater sound signalling or to electromagnetic radiation.

What we claim is:

1. In a ranging system, oscillating means, means for cyclically varying the tuning of the oscillating means whereby there are generated oscillations cyclically varying as to frequency within a given band in accordance with a saw-tooth pattern, filtering and radiating means to pass oscillations at frequencies within a portion only of said band and to radiate the same, means for receiving said oscillations when reflected from objects, means for combining said received oscillations with oscillations generated by said oscillating means, and means for translating the resultant of said combined oscillations into signals.

2. In a ranging system, oscillating means, means for cyclically varying the tuning of the oscillating means whereby there are generated oscillations cyclically varying as to frequency within a given band in accordance with a sawtooth pattern, means including a resonant magnetostrictive unit for radiating oscillations of frequencies within a portion only of said band, means including a resonant magnetostrictive unit of like characteristics as said first mentioned unit for receiving oscillations at frequencies within the mentioned portion of said band when reflected from objects, means for combining said received oscillations with oscillations generated by said oscillating means, and means for translating the resultant of said combined oscillations into signals.

FRANK H. SLAYMAKER.
WILLARD F. MEEKER.

REFERENCES CITED

The following references are of record in the file of this patent:

UNITED STATES PATENTS

| Number | Name | Date |
| --- | --- | --- |
| 2,011,392 | Bentley | Aug. 13, 1935 |
| 2,253,975 | Guanella | Aug. 26, 1941 |
| 2,321,269 | Artzt | June 8, 1943 |
| 2,371,988 | Granqvist | Mar. 20, 1945 |
| 2,405,134 | Brown et al. | Aug. 6, 1946 |

FOREIGN PATENTS

| Number | Country | Date |
| --- | --- | --- |
| 546,202 | Great Britain | July 2, 1942 |